United States Patent [19]
Gillespie

[11] Patent Number: 5,845,717
[45] Date of Patent: Dec. 8, 1998

[54] TRACTOR-MOUNTED WHEEL TRACK CLOSING DEVICE

[76] Inventor: Daniel Gillespie, Box 6, Battle Creek, Nebr. 68715

[21] Appl. No.: 772,555

[22] Filed: Dec. 26, 1996

[51] Int. Cl.[6] .................................................. A01B 59/048
[52] U.S. Cl. ........................ 172/833; 172/304; 172/302; 172/585
[58] Field of Search ..................... 172/834, 333, 172/273, 272, 291, 253, 254, 297, 298–305, 518, 577, 585, 580, 595, 599, 601, 624

[56] References Cited

U.S. PATENT DOCUMENTS

| | | | |
|---|---|---|---|
| 2,164,543 | 7/1939 | Peacock | 172/833 |
| 2,277,880 | 3/1942 | Noble | 172/676 X |
| 2,505,280 | 4/1950 | Ellinghuysen | 172/833 X |
| 2,591,522 | 4/1952 | Dejoy | 172/833 |
| 2,889,640 | 6/1959 | Endres | 172/833 X |
| 3,306,368 | 2/1967 | Rosenvold | 172/833 |
| 3,908,292 | 9/1975 | Harris | 37/142.5 |
| 3,934,363 | 1/1976 | McMurray | 37/82 |
| 4,005,944 | 2/1977 | Harris | 404/133 |
| 4,059,911 | 11/1977 | Bean et al. | 37/142.5 |
| 4,079,788 | 3/1978 | Derr | 172/676 X |
| 4,192,388 | 3/1980 | Goebel | 172/676 X |
| 4,209,068 | 6/1980 | Corsentino | 172/572 |
| 4,262,752 | 4/1981 | Parish | 172/676 X |
| 4,283,867 | 8/1981 | Brown | 37/142.5 |
| 4,539,765 | 9/1985 | Reece | 37/142.5 |
| 4,623,024 | 11/1986 | Schlenker | 172/572 |
| 4,912,862 | 4/1990 | Bishop et al. | 37/142.5 |
| 4,914,840 | 4/1990 | Porter | 37/142.5 |

FOREIGN PATENT DOCUMENTS

| | | | |
|---|---|---|---|
| 1118386 | 3/1956 | France | 172/833 |
| 3001320 | 7/1980 | Germany | 172/833 |
| 175323 | 3/1966 | U.S.S.R. | 172/676 |

Primary Examiner—Terry Lee Melius
Assistant Examiner—Victor Batson
Attorney, Agent, or Firm—Zarley, McKee, Thomte, Voorhees & Sease; Dennis L. Thomte

[57] ABSTRACT

A wheel track closing device is mounted on a tractor for closing the wheel tracks formed by self-propelled irrigation systems. A first soil mover is positioned at the front of the tractor and moves soil laterally to the wheel track from one side thereof, with the soil being moved thereinto being compacted by the right front wheel of the tractor. A second soil mover is mounted at the right side of the tractor between the right front wheel and the right rear wheel and moves soil, from the other side of the wheel track, into the track with the soil that has been moved into the wheel track being compacted by the right rear wheel of the tractor.

15 Claims, 5 Drawing Sheets

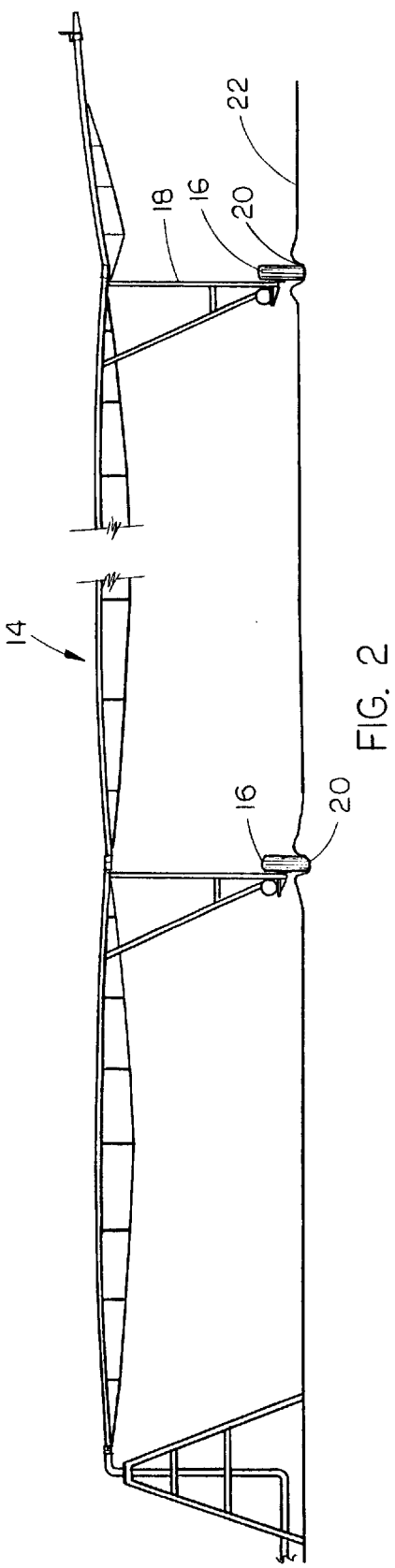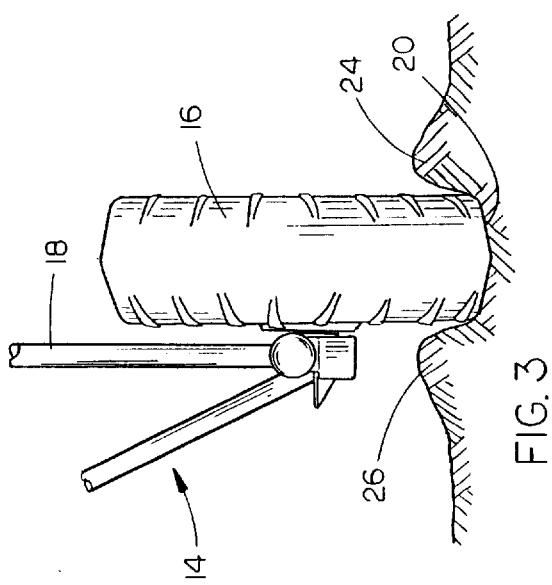

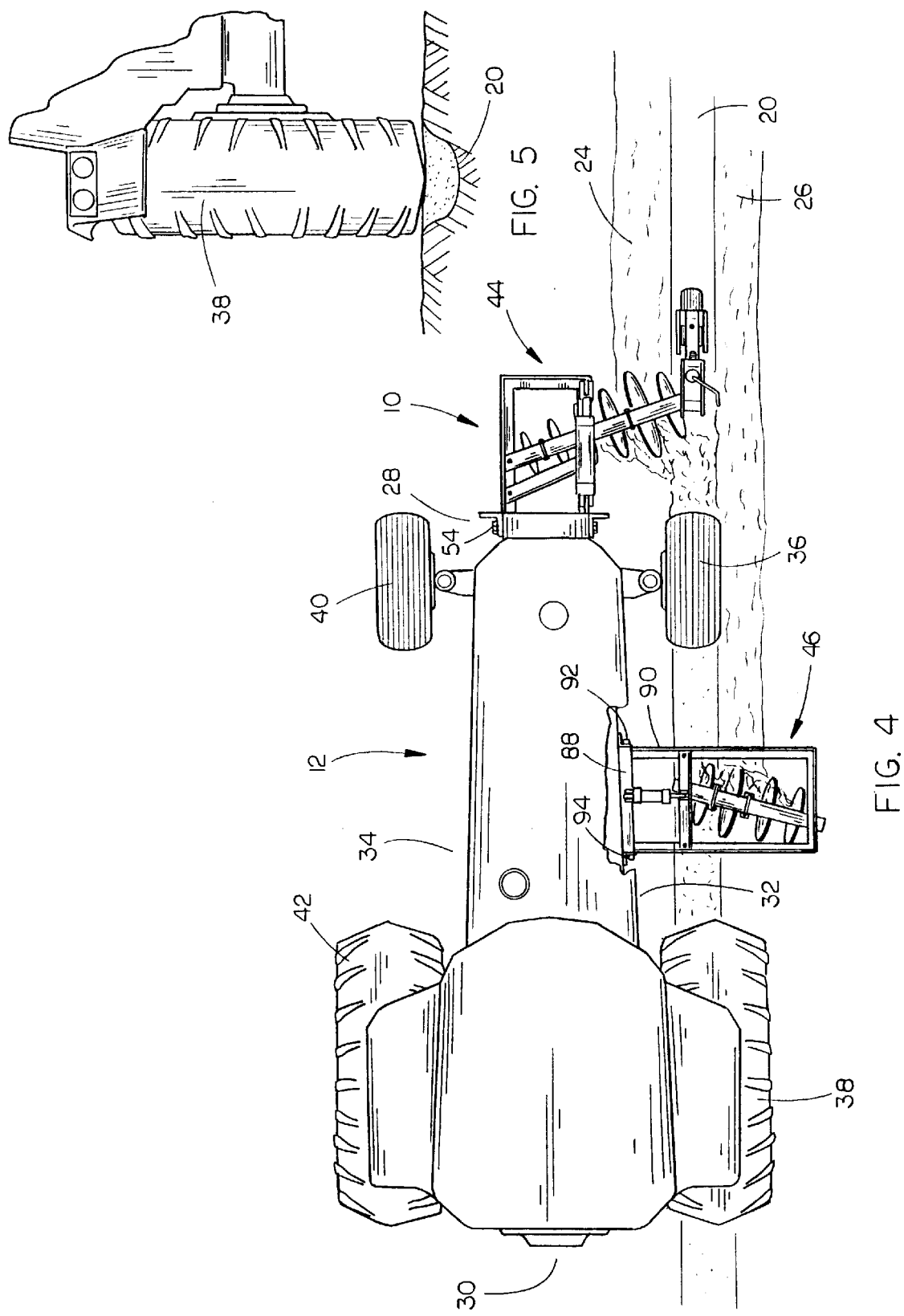

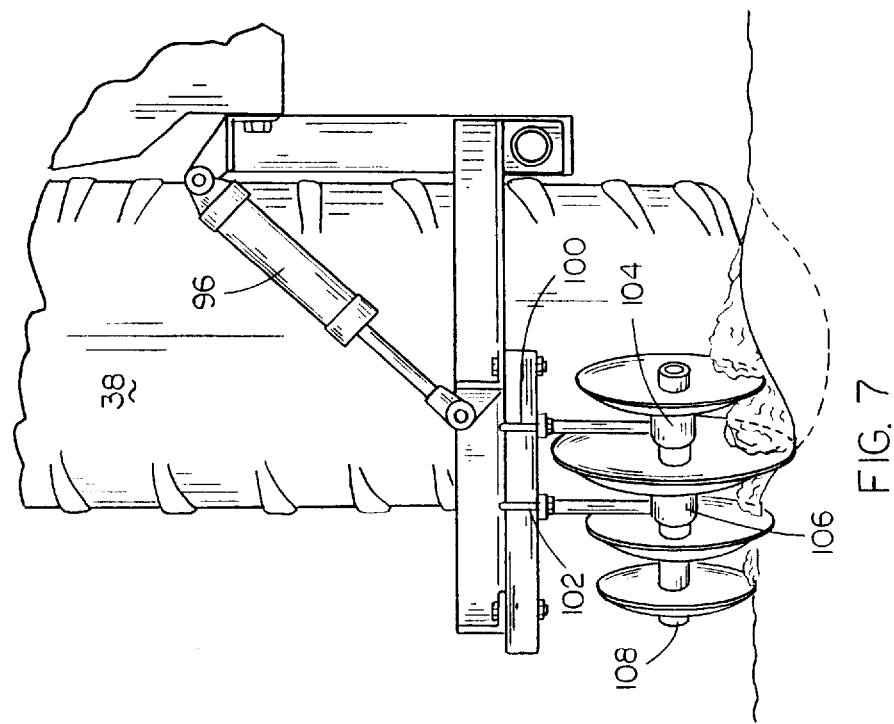
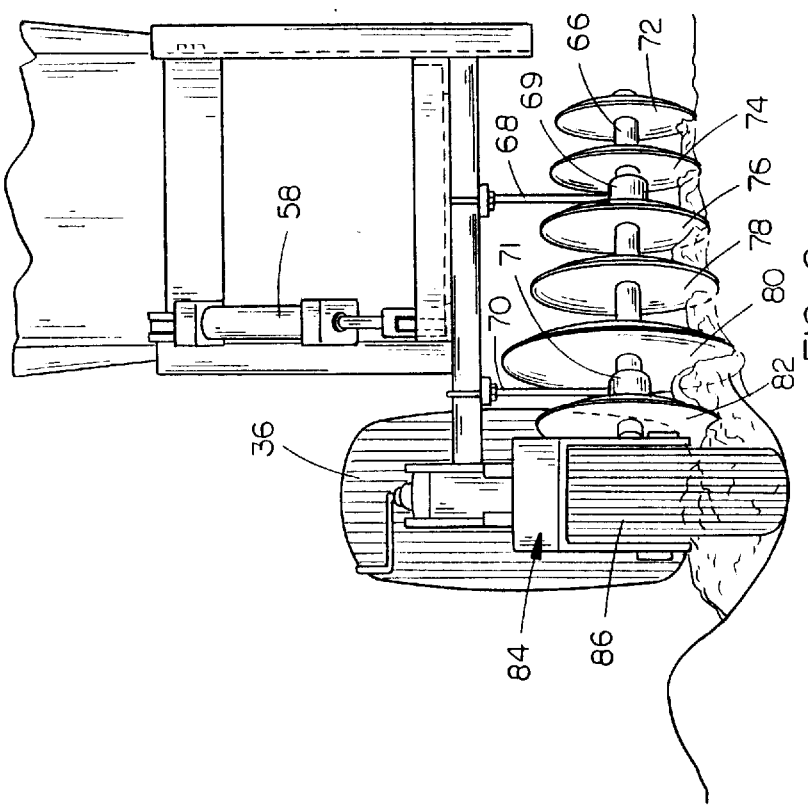

TRACTOR-MOUNTED WHEEL TRACK CLOSING DEVICE

BACKGROUND OF THE INVENTION

1. Field of the Invention

This invention relates to a wheel track closing device and more particularly a wheel track closing device which is mounted on a tractor for closing the wheel tracks formed by a self-propelled irrigation system such as a center-pivot irrigation system.

2. Description of the Related Art

As a self-propelled irrigation system moves through a field, whether the system is a linear system or a center-pivot system, the drive wheels on the support towers create wheel tracks in the field. In addition to creating wheel tracks which extend downwardly into the ground, the drive wheels of the support tower cause soil to be displaced to either side of the wheel track. When the field is being prepared for seeding or the like, the wheel tracks subject the farm machinery to undue stress. Further, in minimum-tillage or no-till fields, the wheel tracks tend to become deeper with each passing season, since the field is not cultivated or disked.

SUMMARY OF THE INVENTION

The invention of this device comprises a wheel track closing device which is mounted on a tractor for closing the wheel tracks formed by self-propelled or mobile irrigation systems. A first disk support is mounted on the forward end of the tractor and has a hydraulic cylinder attached thereto for raising and lowering the same relative to the ground. An adjustable gauge wheel is mounted on the first disk support for vertically adjustably controlling the position of the first disk support with respect to the wheel track. A plurality of disks are rotatably mounted, about a horizontal axis, on the first disk support which move soil laterally outwardly into the wheel track as the tractor is moved through the field. After the disk members on the first disk support have moved soil into the wheel track, the right front wheel of the tractor compacts the "new" soil in the wheel track. A second disk support is positioned at the right side of the tractor between the front and rear wheels at that side of the tractor. A hydraulic cylinder is operatively connected to the second disk support for raising and lowering the second disk support relative to the ground. A plurality of disk members are rotatably mounted, about a horizontal axis, on the second disk support which move soil laterally inwardly into the wheel track from the other side of the wheel track. After the disk members on the second disk support have moved soil into the wheel track, the rear wheel of the tractor then compacts the "new" soil in the wheel track.

It is therefore a principal object of the invention to provide a wheel track closing device.

A further object of the invention is to provide a wheel track closing device which is mounted on a tractor for closing the wheel tracks formed by a self-propelled irrigation system.

Still another object of the invention is to provide a wheel track closing device of the type described which is mounted on a tractor in such a manner so that the wheels at one side of the tractor pack or compact the soil which has been moved into the wheel track by the device.

Yet another object of the invention is to provide a wheel track closing device having gauge wheel adjustment means associated therewith.

Still another object of the invention is to provide a wheel track closing device which has means associated therewith for raising the wheel track closing device upwardly out of ground engagement for transport.

Still another object of the invention is to provide a wheel track closing device having disk members thereon of predetermined diameters so that the track will be substantially level after being closed and compacted.

Still another object of the invention is to provide a wheel track closing device which is quickly and easily mounted on a tractor.

These and other objects will be apparent to those skilled in the art.

BRIEF DESCRIPTION OF THE DRAWINGS

FIG. 2 is a view illustrating a self-propelled irrigation system and the tracks created thereby;

FIG. 3 is a view illustrating the tracks which are created by the drive wheels of a self-propelled irrigation system;

FIG. 4 is a top view of the wheel track closing device of this invention mounted on a tractor;

FIG. 5 is a view of the track after it has been closed;

FIG. 6 is a front view of the front disk section of the wheel track closing device;

FIG. 7 is a front view of the rear disk section of the wheel track closing device;

DESCRIPTION OF THE PREFERRED EMBODIMENT

Figure 1:
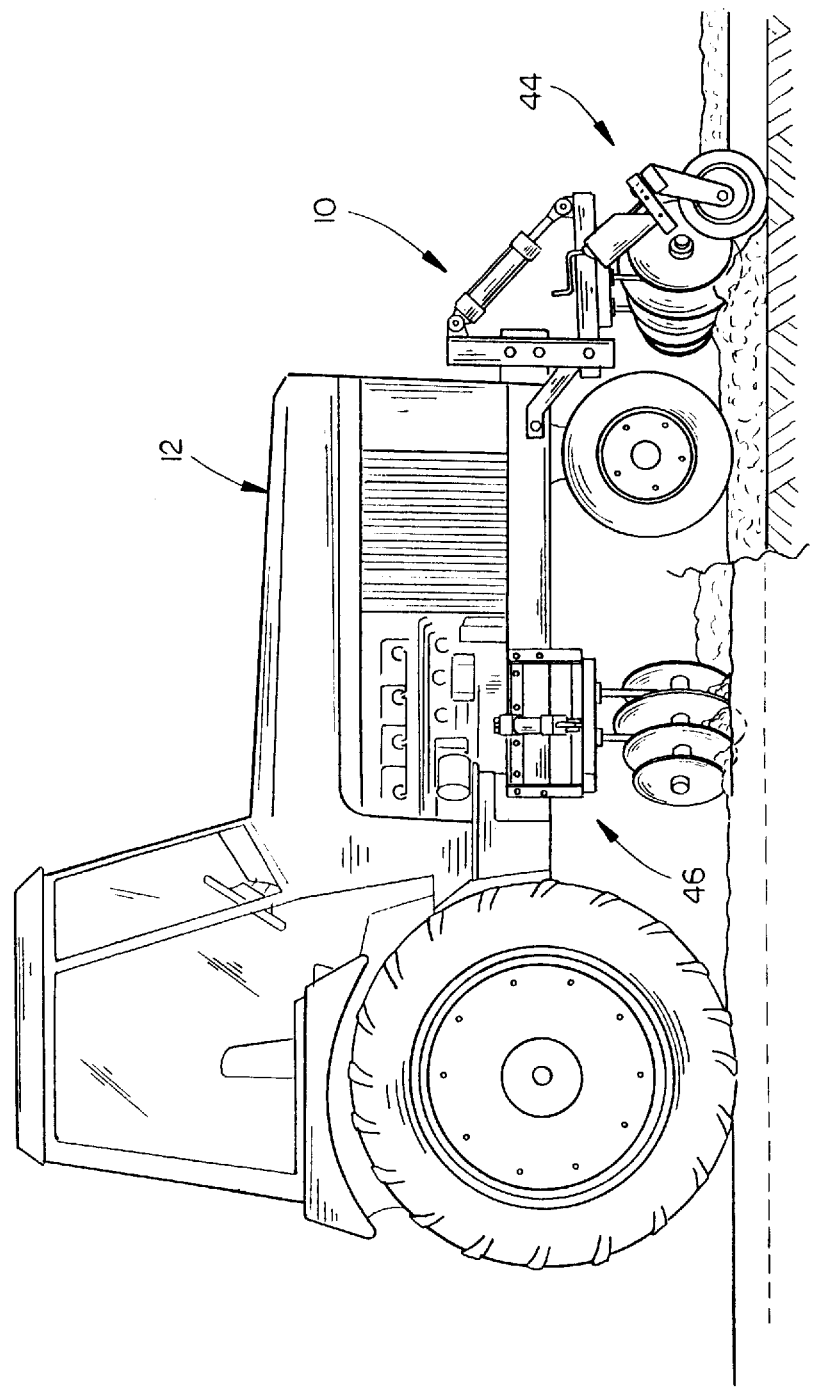
FIG. 1 is a side view of the wheel track closing device of this invention mounted on a tractor.

The numeral 10 refers generally to the wheel track closing device of this invention, which is mounted on a tractor 12, while the numeral 14 refers generally to a self-propelled irrigation system.

System 14 may be a center-pivot system or a linear system. In either case, the drive wheels 16 on the support towers 18 create wheel tracks 20 as the system moves through the field 22. In addition to the wheel tracks 20, the drive wheels 16 cause soil to be displaced laterally with respect to the wheel tracks. For purposes of description, the displaced soil at one side of a wheel track 20 will be designated by the reference numeral 24, while the soil displaced to the other side of the wheel track 20 will be designed by the reference numeral 26.

For purposes of description, tractor 12 will be described as including a forward end 28, rearward end 30, right side 32, and left side 34. Tractor 12 includes a right front wheel 36, a right rear wheel 38, a left front wheel 40, and a left rear wheel 42.

Wheel track closing device 10 includes a first soil mover means 44 which is positioned at the front end of the tractor and a second soil mover means 46 which is positioned at the right side of the tractor between the right front wheel 36 and the right rear wheel 38. Soil mover means 44 includes a disk support means 48 including a fixed support frame 50, which is bolted to the front of the tractor, and a movable support frame 52 which is pivotally mounted on the support frame 50 by any suitable means such as by means of a pair of bolts or pins 54 and 56 or conventional pivot bearings. Hydraulic cylinder 58 is secured to and extends between the support frame 50 and the support frame 52, as illustrated in FIG. 8, to enable the support frame 52 to be pivotally moved with respect to support frame 50 so that the soil moving apparatus 60, attached to support frame 52, may be raised out of ground engagement for transport purposes, if desired.

Although it is preferred that the soil mover apparatus 60 be comprised of a plurality of horizontally spaced disk members, as will be described hereinafter, it is possible that some sort of a scraper blade mechanism could also be utilized, but is not believed that such a scraper mechanism would be able to achieve the desired results as are achieved by the disk members as will now be described.

Figure 8:
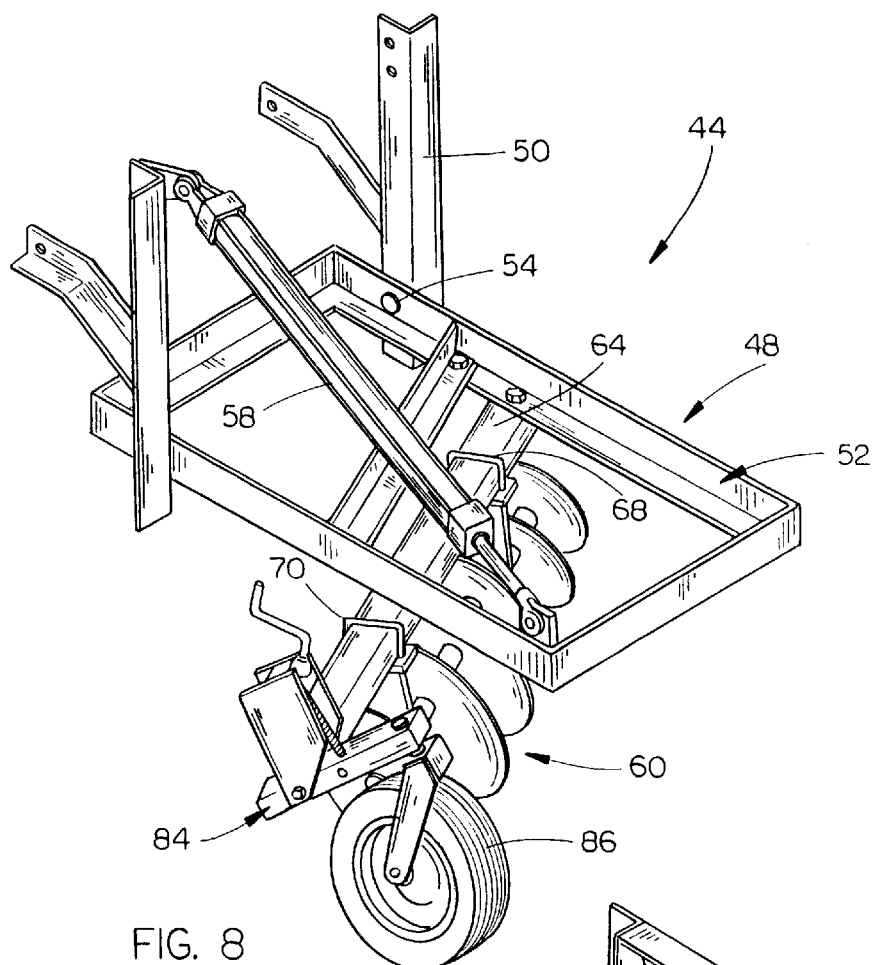
FIG. 8 is a perspective view of the front disk section.

Apparatus 60 is supported on a frame member 64 which is bolted to the support frame 52 and which extends forwardly and outwardly with respect thereto, as best seen in FIGS. 4 and 8. A horizontally disposed axle or shaft 66 is supported beneath the frame member 64 by U-bolt assemblies 68 and 70. Preferably, bearings 69 and 71 are provided at the lower end of the U-bolt assemblies for rotatably mounting the shaft or axle 66. Horizontally spaced-apart disk members 72, 74, 76, 78, 80 and 82 are mounted on the axle or shaft 66 so that they will be rotated by engagement with the ground as the tractor moves the closing device through the field. Preferably, disk members 72, 74, 76, 78, 80 and 82 have diameters of 15", 16", 17", 18", 20" and 18", respectively. Although it is preferred that all of the disk members 72, 74, 76, 78, 80 and 82 be utilized, field tests have shown that disk members 72 and 74 may possibly be eliminated without any appreciable adverse effects.

The numeral 84 refers to a manually adjustable gauge wheel assembly which is mounted on the outer end of frame member 64 and which includes a rotatable and swivel-mounted gauge wheel 86 which is designed to follow along the bottom of the wheel track 20, as best illustrated in FIGS. 4 and 6. The swivel mounting permits the tractor to move either way in the irrigation track, that is, to the right, as viewed in FIG. 4, or in the opposite direction (to the left).

Soil mover means 46 includes a support frame 88 which is bolted to the side of the tractor, as best illustrated in FIGS. 1 and 4, and which has a support frame 90 pivotally secured thereto by any suitable means such as by carrier bearings bolted to support frame 90 and carried on a tubular shaft connected to support frame 88 (not shown) or by means of bolts or pins 92 and 94, as best seen in FIG. 4.

Figure 9:
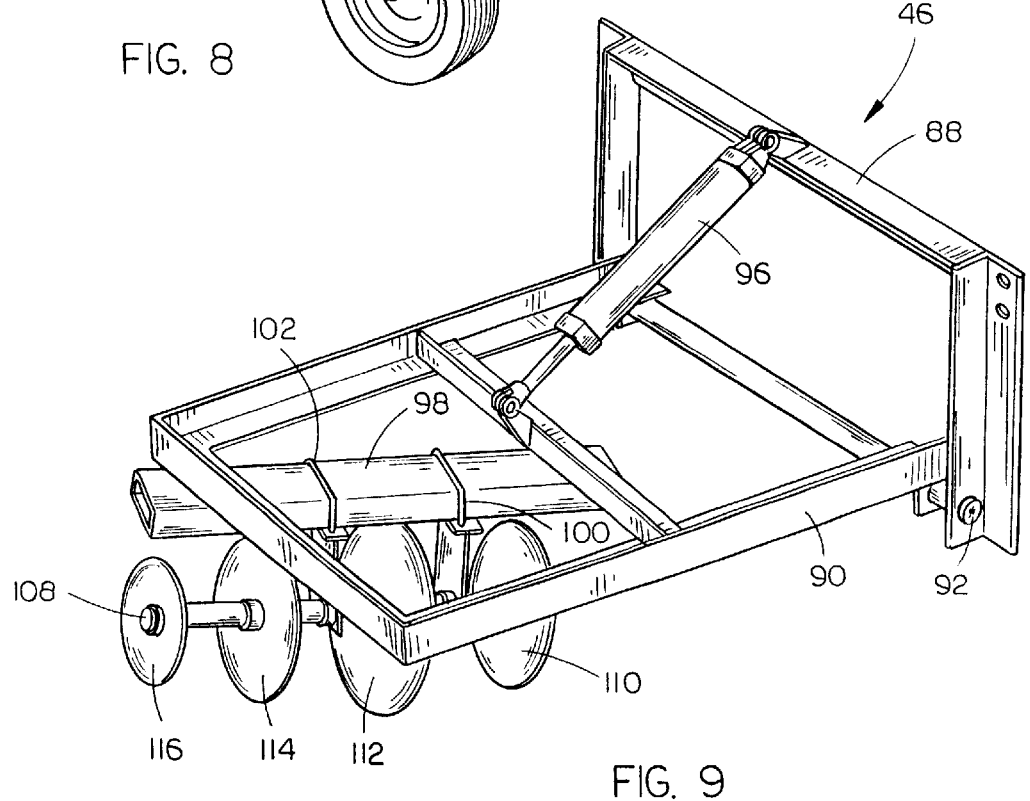
FIG. 9 is a perspective view of the rear disk section.

Hydraulic cylinder 96 is secured to and extends between the support frames 88 and 90, as best seen in FIG. 9, to enable the support frame 90 to be pivotally moved upwardly with respect to the ground to enable the apparatus to be positioned in a transport position. Support frame 90 includes a frame member 98 having a pair of U-bolt assemblies 100 and 102 mounted thereon which preferably have bearing assemblies 104 and 106 mounted at the lower ends thereof, as seen in FIG. 7, for rotatably supporting an axle or shaft 108 therein. Disk members 110, 112, 114 and 116 are mounted on the axle or shaft 108, as seen in the drawings, for rotation therewith, and preferably have diameters of 18", 20", 18" and 17", respectively.

When it is desired to close one of the wheel tracks 20 created in the field by the drive wheels on one of the drive towers of the irrigation system, the tractor 12 is maneuvered with respect to the wheel track 20 until the gauge wheel 86 is positioned directly over the wheel track 20. The gauge wheel 86 is then manually adjusted as desired to limit the downward movement of the disk members. Hydraulic cylinder 58 is then extended until the gauge wheel 86 is lowered to the bottom of the wheel track 20. Conversely, the gauge wheel 86 could be first positioned in the wheel track 20 by the hydraulic cylinder 58 and the necessary adjustment then being made on the gauge wheel assembly. The soil mover 44 is allowed to float with respect to the tractor, that is, the hydraulic cylinder 58 does not control the position of the soil mover 44. Hydraulic cylinder 96 on soil mover means 46 is then lowered to the desired position until the disk members 110, 112, 114 and 116 are in proper ground engagement. The tractor is then moved along the field, with respect to the wheel track 20, so that the gauge wheel 86 follows along the wheel track 20. The disk members 72, 74, 76, 78 and 80 move the soil 24, at one side of the wheel track 20, into the wheel track 20 forwardly of the right front wheel 36. The disk member 82 moves the top edge of the crown of the displaced soil 24 into the track 20. A majority of the displaced soil is moved into the track 20 by the disk member 80, since it has a greater diameter than the other disk members. Disk members 78, 76, 74 and 72 feather the soil to create a substantially level surface at the inner side of the track 20. The right front wheel 36 then compacts the soil which has been moved into the wheel track 20, as illustrated in FIGS. 1 and 6.

The disk members 116, 114, 112, and 110 then move the soil 26 into the wheel track 20, as illustrated in FIG. 4. Disk member 110 moves the top edge of the crown of the displaced soil inwardly into the wheel track. Disk member 112 moves a majority of the displaced soil 26 into the track 20. The disk members 114 and 116 feather the soil to create a substantially level area at the outer side of the wheel track 20. The soil is moved into the wheel track 20 by the disk members 116, 114, 112 and 110 and is then compacted by the right rear wheel 38 of the tractor so that the track is completely filled, as illustrated in FIG. 5.

Although it is described that the soil mover means 44 moves the soil outwardly to the right side of the tractor, the soil mover means 44 could be designed so that it moved the soil outwardly towards the left side of the tractor. In such a case, the soil mover means 46 would be mounted on the left side of the tractor and would move the soil inwardly and forwardly towards the left side of the tractor.

Thus it can be seen that a novel wheel track closing device has been described which enables the wheel tracks created by self-propelled irrigation systems to be closed, thereby reducing the wear and tear on the farm machinery.

Thus it can be seen that the invention accomplishes at least all of its stated objectives.

I claim:

1. A wheel track closing device mounted on a tractor for closing the wheel track formed by a mobile irrigation system, said tractor having a forward end, a rearward end, a right side and a left side, right and left front wheels, and right and left rear wheels, comprising:

a first support means operatively mounted on said tractor at the forward end thereof, a first soil mover means mounted on said first support means positioned in front of said right front wheel of said tractor for laterally moving soil into the wheel track so that said right front wheel of said tractor will compact the soil moved into the wheel track, as said tractor travels the length of the wheel track;

a second support means mounted on said tractor between said right front wheel and said right rear wheel;

and a second soil mover means mounted on said second support means positioned in front of said right rear wheel for laterally moving soil into the wheel track so that said right rear wheel will compact the soil moved into the track, as said tractor travels the length of the wheel track.

2. The wheel track closing device of claim 1 wherein said first soil mover means comprises a first disk means.

3. The wheel track closing device of claim 1 wherein said second soil mover means comprises a second disk means.

4. The wheel track closing device of claim 1 wherein each of said first and second soil mover means comprises a disk means.

5. The wheel track closing device of claim 1 wherein said first soil mover means is positioned between said right and left front wheels and moves soil laterally outwardly, with respect to said tractor, towards said wheel track.

6. The wheel track closing device of claim 5 wherein said second soil mover means moves soil laterally inwardly, with respect to said tractor, towards said wheel track.

7. The wheel track closing device of claim 1 wherein means is connected to said first soil mover means for selectively raising said first soil mover means with respect to the ground.

8. The wheel track closing device of claim 1 wherein means is connected to said second soil mover means for selectively raising said second soil mover means with respect to the ground.

9. The wheel track closing device of claim 1 wherein said first soil mover means includes a selectively vertically adjustable gauge wheel means.

10. The wheel track closing device of claim 1 wherein said first soil mover means moves soil outwardly and forwardly with respect to said tractor.

11. The wheel track closing device of claim 10 wherein said second soil mover means moves soil inwardly and forwardly with respect to said tractor.

12. A wheel track closing device mounted on a tractor for closing a wheel track formed by a mobile irrigation system, said tractor having a forward end, a rearward end, a right side and a left side, right and left front wheels, and right and left rear wheels, comprising:

a first support means operatively mounted on said tractor at the forward end thereof;

a first soil mover means mounted on said first support means positioned in front of said right front wheel of said tractor for laterally moving soil into the wheel track so that said right front wheel of said tractor will compact the soil moved into the wheel track, as said tractor travels the length of the wheel track;

a second support means mounted on said tractor between said right front wheel and said right rear wheel;

and a second soil mover means mounted on said second support means positioned in front of said right rear wheel for laterally moving soil into the wheel track so that said right rear wheel will compact the soil moved into the track, as said tractor travels the length of the wheel track;

said first soil mover means comprising a first disk means;

said first disk means comprising a plurality of horizontally spaced-apart disk members; at least one of said disk members of said first disk means having a greater diameter than the other disk members of said first disk means.

13. A wheel track closing device mounted on a tractor for closing a wheel track formed by a mobile irrigation system, said tractor having a forward end, a rearward end, a right side and a left side, right and left front wheels, and right and left rear wheels, comprising:

a first support means operatively mounted on said tractor at the forward end thereof;

a first soil mover means mounted on said first support means positioned in front of said right front wheel of said tractor for laterally moving soil into the wheel track so that said right front wheel of said tractor will compact the soil moved into the wheel track, as said tractor travels the length of the wheel track;

a second support means mounted on said tractor between said right front wheel and said right rear wheel;

and a second soil mover means mounted on said second support means positioned in front of said right rear wheel for laterally moving soil into the wheel track so that said right rear wheel will compact the soil moved into the track, as said tractor travels the length of the wheel track;

said second soil mover means comprising a second disk means;

said second disk means comprising a plurality of horizontally spaced-apart disk members;

at least one of said disk members of said second disk means having a greater diameter than the other disk members of said second disk means.

14. A wheel track closing device mounted on a tractor for closing a wheel track formed by a mobile irrigation system, said tractor having a forward end, a rearward end, a right side and a left side, right and left front wheels, and right and left rear wheels, comprising:

a first support means operatively mounted on said tractor at the forward end thereof;

a first soil mover means mounted on said first support means positioned in front of said right front wheel of said tractor for laterally moving soil into the wheel track so that said right front wheel of said tractor will compact the soil moved into the wheel track, as said tractor travels the length of the wheel track;

a second support means mounted on said tractor between said right front wheel and said right rear wheel;

and a second soil mover means mounted on said second support means positioned in front of said right rear wheel for laterally moving soil into the wheel track so that said right rear wheel will compact the soil moved into the track, as said tractor travels the length of the wheel track;

said first soil mover means comprising a first disk means;

said second soil mover means comprising a second disk means;

said first disk means comprising a plurality of horizontally spaced-apart disk members;

said second disk means comprising a plurality of horizontally spaced-apart disk members;

at least one of said disk members of said first disk means having a greater diameter than the other disk members of said first disk means;

at least one of said disk members of said second disk means having a greater diameter than the other disk members of said second disk means.

15. A wheel track closing device mounted on a tractor for closing a wheel track formed by a mobile irrigation system, said tractor having a forward end, a rearward end, a right side and a left side, right and left front wheels, and right and left rear wheels, comprising:

a first support means operatively mounted on said tractor at the forward end thereof;

a first soil mover means mounted on said first support means positioned in front of said right front wheel of said tractor for laterally moving soil into the wheel track so that said right front wheel of said tractor will compact the soil moved into the wheel track, as said tractor travels the length of the wheel track;

a second support means mounted on said tractor between said right front wheel and said right rear wheel;

and a second soil mover means mounted on said second support means positioned in front of said right rear wheel for laterally moving soil into the wheel track so that said right rear wheel will compact the soil moved into the track, as said tractor travels the length of the wheel track;

said first soil mover means including a selectively vertically adjustable gauge wheel means;

said gauge wheel means including a gauge wheel;

said gauge wheel being positioned on said first soil mover means so that said gauge wheel may be positioned in the wheel track.

\* \* \* \* \*